United States Patent
Schmitt

(10) Patent No.: US 9,281,636 B1
(45) Date of Patent: Mar. 8, 2016

(54) CABLE ASSEMBLY HAVING A FLEXIBLE LIGHT PIPE

(71) Applicant: Tyco Electronics Corporation, Berwyn, PA (US)

(72) Inventor: Matthew Ryan Schmitt, Middletown, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 14/608,400

(22) Filed: Jan. 29, 2015

(51) Int. Cl.
*H01R 3/00* (2006.01)
*H01R 13/717* (2006.01)
*H01R 12/70* (2011.01)

(52) U.S. Cl.
CPC ........ *H01R 13/7175* (2013.01); *H01R 12/7076* (2013.01)

(58) Field of Classification Search
CPC ........... H01R 13/7175; H01R 13/7172; H01R 12/7076
See application file for complete search history.

(56) References Cited

U.S. PATENT DOCUMENTS

| | | | | |
|---|---|---|---|---|
| 3,792,284 | A * | 2/1974 | Kaelin | G02B 6/4295 250/227.24 |
| 3,892,962 | A * | 7/1975 | Whited | G03G 15/0855 250/227.24 |
| 7,186,144 | B1 * | 3/2007 | Khemakhem | H01R 13/6658 439/581 |
| 7,249,966 | B2 * | 7/2007 | Long | H01R 13/65802 439/490 |
| 7,621,773 | B2 * | 11/2009 | Bright | G02B 6/0008 439/490 |
| 7,670,170 | B2 | 3/2010 | Henry et al. | |
| 8,638,233 | B2 * | 1/2014 | Aguren | G02B 6/4292 439/490 |
| 8,684,765 | B2 * | 4/2014 | Shirk | G02B 6/0008 439/490 |
| 9,083,123 | B2 * | 7/2015 | Homan | H01R 13/717 |
| 2002/0001202 | A1 * | 1/2002 | Williams | A61B 17/02 362/572 |
| 2005/0052174 | A1 * | 3/2005 | Angelo | H01R 13/7172 324/66 |
| 2005/0266723 | A1 * | 12/2005 | Graham | H01R 13/7172 439/490 |
| 2007/0059975 | A1 * | 3/2007 | Walsh | H01R 13/6691 439/490 |
| 2007/0237463 | A1 * | 10/2007 | Aronson | G02B 6/4292 385/89 |
| 2007/0253168 | A1 * | 11/2007 | Miller | G02B 6/4246 361/719 |
| 2009/0129725 | A1 * | 5/2009 | Durrant | G02B 6/4201 385/14 |
| 2009/0274422 | A1 * | 11/2009 | Henry | H01R 13/7172 385/92 |
| 2009/0280677 | A1 * | 11/2009 | Gingrich, III | H01R 13/7172 439/490 |
| 2010/0068904 | A1 * | 3/2010 | Henry | H01R 13/514 439/81 |

* cited by examiner

Primary Examiner — Briggitte R Hammond

(57) ABSTRACT

A cable assembly includes a cable bundle extending between first and second cable ends. A first electrical connector is terminated to the first cable end and has first contacts defining a first mating interface. A second electrical connector is terminated to the second cable end and has second contacts defining a second mating interface. A flexible light pipe extends along the length of the cable bundle. The flexible light pipe has a first light pipe interface at a first end of the flexible light pipe and a second light pipe interface at a second end of the flexible light pipe. The first light pipe interface is at or beyond the first cable end for interfacing with a component associated with a first mating connector and the second light pipe interface is at or beyond the second cable end for interfacing with a component associated with a second mating connector.

20 Claims, 3 Drawing Sheets though the cable connector system 8 may be part of or used with telecommunication systems or devices. For example, the cable connector system 8 may be part of or include a switch, router, server, hub, network interface card, or storage system. In the illustrated embodiment, the cable connector system 8 is configured to transmit data signals in the form of electrical signals. In other embodiments, the cable connector system 8 may be configured to transmit data signals in the form of optical signals.

CABLE ASSEMBLY HAVING A FLEXIBLE LIGHT PIPE

BACKGROUND OF THE INVENTION

The subject matter herein relates generally to a cable assembly having a flexible light pipe.

Connector systems, such as those used in data communication systems, typically use light pipes as status indicators, which provide link status, transmit status and/or receive status of a particular data channel. Current light pipe designs are typically custom molded parts that are rigid and do not function well over long distances. As such, the light source, such as the light emitting diode (LED) must be positioned in close proximity to the panel or faceplate defining the status indicator area of the system. For example, a receptacle connector of the connector system may be mounted to a circuit hoard, which is positioned immediately behind the faceplate. A circuit operating the light source similarly must be provided on the circuit board near the receptacle connector. Additionally, the light source, circuit, light pipes and other components occupy real estate in and around the receptacle connector, limiting useable space and restricting airflow around the receptacle connector used for cooling the receptacle connector and/or the associated pluggable module. Furthermore, in some connector systems, the circuit board may be positioned a long distance from the status indicator area, making the rigid light pipe costly or impractical.

Accordingly, there is a need for a connector system that incorporates light pipes positionable in convenient locations and/or operable over long distances.

BRIEF DESCRIPTION OF THE INVENTION

In an embodiment, a cable assembly is provided including a cable bundle extending a length from a first cable end to an opposite second cable end. The electrical cable includes a plurality of electrical wires within an outer jacket. A first electrical connector is terminated to the first cable end of the electrical cable. The first electrical connector has first contacts defining a first mating interface for mating with a first mating connector. A second electrical connector is terminated to the second cable end of the electrical cable. The second electrical connector has second contacts defining a second mating interface for mating with a second mating connector. A flexible light pipe extends along the length of the cable bundle. The flexible light pipe has a first light pipe interface at a first end of the flexible light pipe. The flexible light pipe has a second light pipe interface at a second end of the flexible light pipe. The first light pipe interface is at or beyond the first cable end for interfacing with a component associated with the first mating connector and the second light pipe interface is at or beyond the second cable end for interfacing with a component associated with the second mating connector.

In another embodiment, a cable connector system is provided including an electrical connector having a cage defining at least one port configured to receive a communication module therein. The cage has a faceplate at a front thereof having a status indicator opening in the faceplate. The electrical connector has a plurality of contacts defining a receptacle interface configured to communicatively couple with the communication module when plugged into the port. A cable assembly is electrically coupled to the electrical connector and extends rearward of the cage. The cable assembly has a cable bundle having a plurality of electrical wires terminated to corresponding contacts of the electrical connector. The cable assembly has a flexible light pipe that extends along the cable bundle rearward of the cage. The flexible light pipe extends forward of the receptacle interface within the cage to the faceplate. The flexible light pipe has a light emitting end arranged at the status indicator opening in the faceplate to emit light indicative of a status of the electrical connector.

In a further embodiment, a cable connector system is provided including a circuit board having a light source mounted thereto. A board connector is mounted to the circuit board and has board contacts terminated to the circuit board. A cable assembly is coupled to the board connector. The cable assembly has an electrical connector electrically coupled to the board connector. The electrical connector has first contacts defining a mating interface for mating with the board contacts of the board connector. The cable assembly has a cable bundle extending from the electrical connector. The cable bundle includes a plurality of electrical wires terminated to corresponding first contacts of the electrical connector. The cable assembly has a flexible light pipe that extends along the cable bundle. The flexible light pipe is configured to receive the light emitted from the light source and transmit the light along the cable bundle to a remote location.

DETAILED DESCRIPTION OF THE INVENTION

Figure 1:
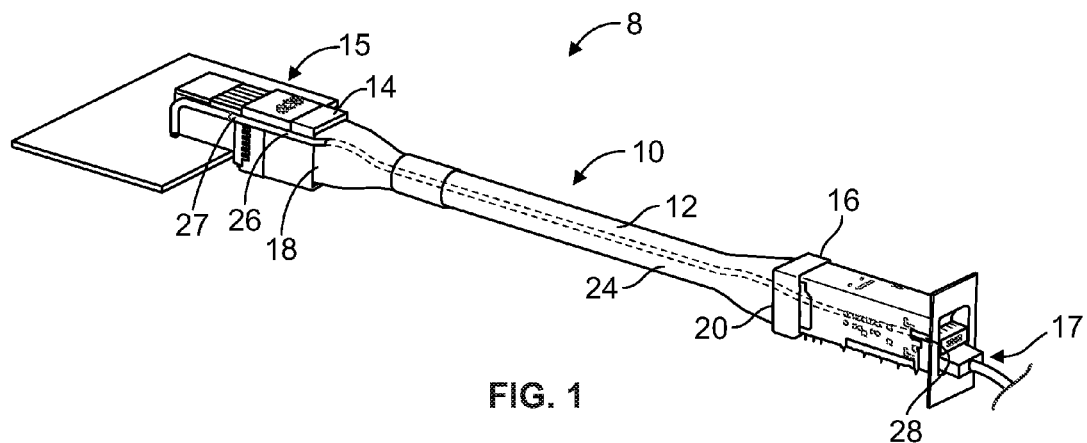
FIG. 1 is a perspective view illustrating an embodiment of a cable connector system.

FIG. 1 is a perspective view illustrating an embodiment of a cable connector system 8. The cable connector system 8 may be part of or used with telecommunication systems or devices. For example, the cable connector system 8 may be part of or include a switch, router, server, hub, network interface card, or storage system. In the illustrated embodiment, the cable connector system 8 is configured to transmit data signals in the form of electrical signals. In other embodiments, the cable connector system 8 may be configured to transmit data signals in the form of optical signals.

The cable connector system 8 includes a cable assembly 10 having a cable bundle 12 extending between a first electrical connector 14 and a second electrical connector 16. The first electrical connector 14 is mated with a first connector assembly 15 and the second electrical connector 16 is mated with a second connector assembly 17. Optionally, the first and second electrical connectors 14, 16 may be identical (for example, include identical mating interfaces). However, as in the illustrated embodiment, the first and second electrical connectors 14, 16 may be different (for example, include different mating interfaces), such as when mated to different connector assemblies 15, 17. In the illustrated embodiment, the first connector assembly 15 is a right-angle, high-speed circuit board mounted connector assembly; however the first connector assembly 15 is not limited to such type of connector assembly. In the illustrated embodiment, the second connector assembly 17 is an input/output communication connector, such as an SFP connector; however the second connector assembly 17 is not limited to such type of connector assembly. The electrical connectors 14, 16 have appropriate, complementary mating interfaces for mating with the particular connector assemblies 15, 17.

The cable bundle 12 extends a length from a first cable end 18 to an opposite second cable end 20. The electrical connector 14 is terminated (for example, electrically and mechanically connected) to the end 18 of the cable bundle 12, while the electrical connector 16 is terminated to the end 20 of the cable bundle 12. Accordingly, the cable bundle 12 extends between, and interconnects, the electrical connectors 14 and 16. Each of the electrical connectors 14 and 16 may be referred to herein as a "first" and/or a "second" electrical connector. Each of the ends 18 and 20 of the cable bundle 12 may be referred to herein as a "first cable" end and/or a "second cable" end.

The cable bundle 12 includes a plurality of electrical wires 22 (shown in FIG. 2) held within an outer jacket 24; however the cable bundle 12 may be provided without the outer jacket 24 in alternative embodiments. The cable bundle 12 may include a shield within the outer jacket 24.

In an exemplary embodiment, the cable bundle 12 includes one or more flexible light pipes 26 extending the length of the cable bundle 12. Each flexible light pipe 26 extends between a first end 27 and a second end 28 opposite the first end 27. The flexible light pipe 26 may be routed interior of the outer jacket 24. The flexible light pipe 26 may be routed exterior of the outer jacket 24. Optionally, portions of the flexible light pipe 26 may be interior and other portions of the flexible light pipe 26 may be exterior of the outer jacket 24. The flexible light pipe 26 may be attached directly to the outer jacket 24. The flexible light pipe 26 may be wound with the electrical wires within the outer jacket 24 during cabling of the cable bundle 12.

The flexible light pipe 26 interfaces with corresponding components associated with the first and second connector assemblies 15, 17 to transmit light therebetween. For example, the first end 27 may be provided at or near the first connector 14 and/or the first connector assembly 15 while the second end 28 may be provided at or near the second electrical connector 16 and/or the second connector assembly 17. The flexible light pipe 26 may receive light from the first connector assembly 15 and transmit the light to the second connector assembly 17. In various embodiments, the light may correspond with status indicators associated with the electrical connectors 14, 16 and/or connector assemblies 15, 17. For example, the status indicators may relate to link status of the electrical connectors 14, 16 and/or connector assemblies 15, 17. The status indicators may relate to transmit and/or receive status of the electrical connectors 14, 16 and/or connector assemblies 15, 17. The status indicators may provide a visual indication as to the status of the electrical connectors 14, 16 and/or connector assemblies 15, 17 to an operator, such as at a server or network hub.

The flexible light pipe 26 transmits the light from one connector assembly, such as the first connector assembly 15, to the other connector assembly, such as the second connector assembly 17. As such, the second connector assembly 17 does not need to have the light emitting source (for example, the light emitting diode), but rather such source may be remote from the second connector assembly 17. The flexible light pipe 26 allows the light to be transmitted over long distances and does not require a fixed light pipe between the two ends or components. The flexible light pipe 26 allows user installable routing of the components without requiring fixed light components between the two ends.

Figure 2:
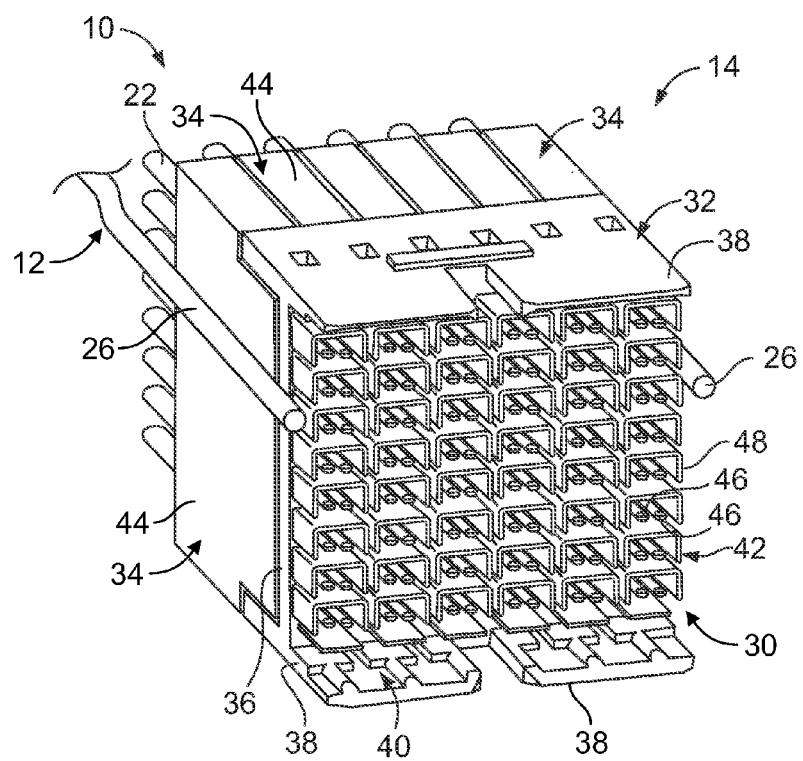
FIG. 2 is a front perspective view of a portion of a cable assembly of the cable connector system.

FIG. 2 is a front perspective view of a portion of the cable assembly 10. The outer jacket 24 has been removed from the cable assembly 10 in FIG. 2 to better illustrate the cable bundle 12. In the illustrated embodiment, the cable bundle 12 includes a plurality of the electrical wires 22. Each electrical wire 22 includes one or more electrical conductors. Optionally, each electrical wire 22 is individually insulated and/or individually shielded. Moreover, each electrical conductor of each electrical wire 22 is optionally individually insulated and/or individually shielded.

The cable bundle 12 may include any number of the electrical wires 22, and each electrical wire 22 may include any number of electrical conductors. In the illustrated embodiment, each electrical wire 22 is a twin-axial wire having two signal conductors contained within a common jacket. The signal conductors convey differential signals and are shielded. Other types of electrical wires 22 may be provided in other embodiments. For example, the electrical wires 22 may be coaxial wires having a single signal conductor therein. In other embodiments, the wires 22 may be optical wires rather than electrical wires.

The electrical connector 14 is illustrated in FIG. 2. The electrical connector 14 may be any type of electrical connector; however, in the illustrated embodiment, the electrical connector 14 is a STRADA Whisper header connector, commercially available from TE Connectivity, Harrisburg, Pa. In an embodiment, the electrical connector 14 is a high speed differential pair cable connector that includes a plurality of differential pairs of conductors, such as contacts or terminals, mated at a common mating interface 30 of the electrical connector 14. The differential conductors may be shielded along the signal paths thereof to reduce noise, crosstalk, and/or other interference along the signal paths of the differential pairs. In other various embodiments, the electrical connector 14 is a single-ended cable connector.

In the illustrated embodiment, the electrical connector 14 includes a housing 32 that holds a plurality of contact modules 34. The housing 32 includes a base wall 36 and shroud walls 38 extending from the base wall 36 to define a mating cavity 40 configured to receive a complementary mating connector of the cable assembly 15 (shown in FIG. 1). The shroud walls 38 guide mating of the electrical connector 14 with the complementary mating connector.

Each of the contact modules 34 includes a plurality of cable contact assemblies 42 held by a support body 44. Each cable contact assembly 42 includes signal contacts 46 terminated to corresponding signal wires 22. Each cable contact assembly 42 also includes a ground shield 48 providing shielding for the signal contacts 46. In the illustrated embodiment, the ground shield 48 peripherally surrounds the signal contacts 46 along substantially the entire length of the signal contacts 46 to ensure that the signal paths are electrically shielded. The signal contacts 46 and corresponding ground shields 48 may define the mating interface 30 of the electrical connector 14. Optionally, portions of the housing 32 may define the mating interface 30.

The support body 44 provides support for the cable contact assemblies 42. The electrical wires 22 extend into the support body 44 such that the support body 44 supports a portion of the electrical wires 22. Optionally, the support body 44 may be overmolded over portions of the electrical wires 22. The support body 44 may provide strain relief for the electrical wires 22. Optionally, the support body 44 may be fabricated from a plastic and/or other dielectric material. In addition or alternatively, the support body 44 may be fabricated from one or more metal materials. At least a portion of the support body 44 is optionally electrically conductive to provide electrical shielding for the electrical wires 22 and/or the signal contacts 46. For example, a majority or an approximate entirety of the support body 44 may be fabricated from one or more metal material to provide such electrical shielding. In other embodiments, the support body 44 may be a metalized dielectric material (e.g., a dielectric material plated or otherwise coated with a metal material, a dielectric material filled with a metal material, and/or the like) to provide electrical shielding for the electrical wires 22 and/or signal contacts 46. In an embodiment, the support body 44 includes a metal plate (not shown) that is electrically connected to each ground shield 48 (to electrically common each ground shield 48) and is surrounded by a dielectric material (e.g., an overmold and/or the like).

As can be seen in FIG. 2, multiple contact modules 34 are loaded into the housing 32. In the illustrated embodiment, the housing 32 holds the contact modules 34 in parallel such that the cable contact assemblies 42 are aligned in columns. Any number of contact modules 34 may be held by the housing 32 depending on the particular application. When the contact modules 34 are stacked in the housing 32, the cable contact assemblies 42 may also be aligned in rows.

Optionally, the second electrical connector 16 (shown in FIG. 1) may be substantially identical the first electrical connector 14. Alternatively, the second electrical connector 16 may have a differently shaped housing, may have differently shaped contacts and/or may have the contacts arranged in a different arrangement. Contacts of the second electrical connector 16 may be electrically connected to corresponding contacts 46 of the first electrical connector 14 via corresponding wires 22.

The flexible light pipe 26 is routed in the cable bundle 12 with the wires 22. Optionally, multiple flexible light pipes 26 may be routed in the cable bundle 12. In an exemplary embodiment, the flexible light pipe 26 may be routed, at least along a length, within the outer jacket 24 (shown in FIG. 1). The flexible light pipe 26 may be manufactured from an optical grade plastic material. The flexible light pipe 26 may be bent, twisted or otherwise manipulated with the cable bundle 12.

The flexible light pipe 26 may be routed along the exterior of the housing 32. Alternatively, the flexible light pipe 26 may be routed interior of the housing 32, such as by passing to and/or through the mating interface 30. For example, the flexible light pipe 26 may be routed through one of the contact modules 34 to interface at the mating interface 30. Alternatively, the flexible light pipe 26 may be routed through one of the contact modules 34 to an exterior of the contact module 34, such as along the top of the contact module and/or the housing 32.

Figure 3:
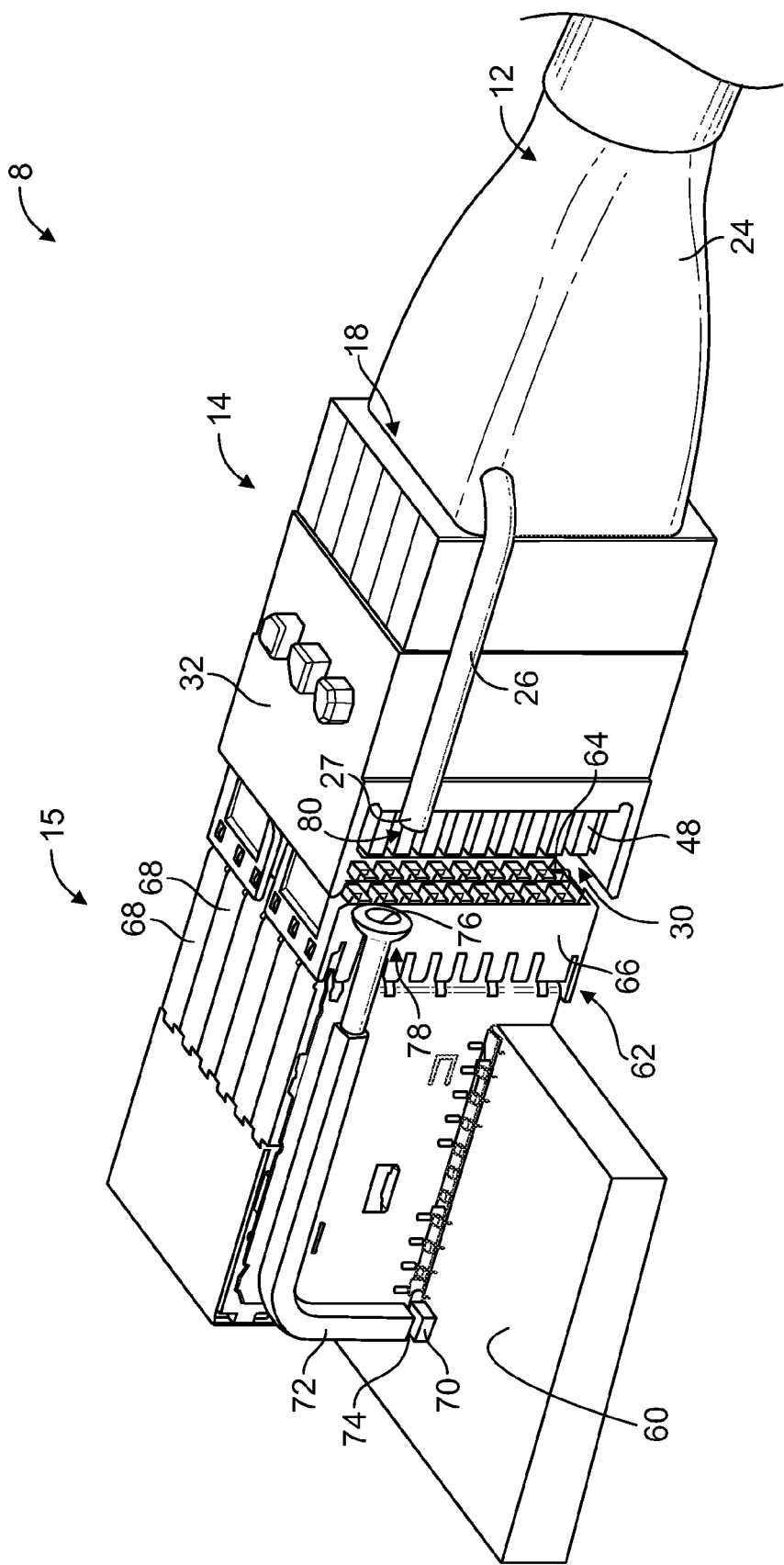
FIG. 3 is a perspective view of a portion of the cable connector system, showing an electrical connector and a connector assembly in accordance with an embodiment.

FIG. 3 is a perspective view of a portion of the cable connector system 8, showing the first electrical connector 14 and the connector assembly 15 in accordance with an embodiment. The flexible light pipe 26 is shown exiting the outer jacket 24 immediately behind the electrical connector 14. The flexible light pipe 26 extends along a side of the housing 32 of the electrical connector 14. The first end 27 of the flexible light pipe 26 extends beyond the first cable end 18 of the cable bundle 12. Optionally, the first end 27 of the flexible light pipe 26 may be approximately aligned with the signal contacts 46 (FIG. 2) in the ground shields 48 at the mating interface 30. The flexible light pipe 26 is positioned for interfacing with a corresponding component associated with the connector assembly 15. Optionally, another flexible light pipe (not shown) may be provided on the opposite side of the electrical connector 14, which also extends into the outer jacket 24 of the cable bundle 12.

The connector assembly 15 includes a circuit board 60 and a board connector 62 mounted thereto. The board connector 62 defines a mating connector for the electrical connector 14, and may be referred to herein after as mating connector 62. In alternative embodiments, rather than being board-mounted, the mating connector 62 may be provided at an end of a cable in a similar manner as the electrical connector 14.

The board connector 62 may be any type of electrical connector; however, in the illustrated embodiment, the board connector 62 is a STRADA Whisper receptacle connector, commercially available from TE Connectivity, Harrisburg, Pa. The board connector 62 is a complementary connector to the electrical connector 14 and includes a complementary mating interface 64. The board connector 62 may be a high speed differential pair connector that includes a plurality of differential pairs of conductors, such as contacts or terminals, mated to the signal contacts 46. The board connector 62 may have grounding features that mate with the ground shields 48 of the electrical connector 14.

In the illustrated embodiment, the board connector 62 includes a housing 66 that holds a plurality of contact modules 68. The contact modules 68 hold a plurality of the mating contacts configured to be mated with the signal contacts 46 (FIG. 2) of the electrical connector 14. The contacts of the contact modules 68 are terminated to the circuit board 60, such as by press fitting or soldering pins to the circuit board 60. Other types of electrical connectors may be used in alternative embodiments.

The connector assembly 15 includes a light source 70, such as a light emitting diode (LED) 70, mounted to the circuit board 60. The connector assembly 15 includes a board light pipe 72 mounted to at least one of the circuit board 60 and/or the board connector 62. The board light pipe 72 has a first end 74 that receives light from the LED 70 and a second end 76 opposite the first end 74. The board light pipe 72 may be a rigid light pipe. The board light pipe 72 may be manufactured from a hard plastic material. In the illustrated embodiment, the board light pipe 72 has a right angle configuration that directs light both vertically and horizontally. Other configurations are possible in alternative embodiments. The light from the LED 70 is internally reflected along the length of the board light pipe 72 from the first end 74 to the second end 76.

The first end 27 of the flexible light pipe 26 defines a light pipe interface 80 that is configured to interface with the second end 76 of the board light pipe 72. The first end 27 of the flexible light pipe 26 defines a light receiving end of the flexible light pipe 26. Optionally, the light pipe interface 80 may abut against the second end 76 of the board light pipe 72 when the electrical connector 14 is mated with the board connector 62. For example, as the electrical connector 14 is plugged onto the board connector 62 the flexible light pipe 26 is moved toward the board light pipe 72 until the light pipe interface 80 abuts against the second end 76. In an exemplary embodiment, because the light pipe 26 is flexible, the light pipe 26 may flex or deflect after the first end 27 abuts against the second end 76.

In an exemplary embodiment, the board light pipe 72 includes a cone 78 at the second end 76. The cone 78 has a receptacle that receives the first end 27 of the flexible light pipe 26. The cone 78 may be used to align the flexible light pipe 26 with the board light pipe 72. Other types of guide features may be used in alternative embodiments to align the flexible light pipe 26 with the board light pipe 72. In alternative embodiments, the cone 78 may be provided at the first end 27 of the flexible light pipe 26.

In alternative embodiments, rather than extending along the side of the board connector 62, the board light pipe 72 may extend along the back and the top of the board connector 62 to interface with the flexible light pipe 26 above the first connector 14 and/or the board connector 62. In other alternative embodiments, the board light pipe 72 may be routed inside the board connector 62. For example, one or more of the contact modules 68 may hold or define the board light pipe 72. In such embodiments, the board light pipe 72 may interface with the flexible light pipe 26 at the mating interface 30 as opposed to alongside or along top of the mating interface 30.

In an alternative embodiment, rather than having the board light pipe 72, the flexible light pipe 26 may be routed to the LED 70 and receive light directly from the LED 70 rather than receiving light through the board light pipe 72. In such embodiments, the LED 70 may be positioned closer to the mating interface 30. The flexible light pipe 26 may be longer to accommodate routing along the board connector 62 to the LED 70.

The LED 70 and/or board light pipe 72 define a component associated with the mating connector 62 that interfaces with the flexible light pipe 26 to transmit light through the light pipe 26. The light transmitted by the components and the flexible light pipe 26 may indicate to a user a status of the cable connector system 8. For example, the status may characterize the communicative connection between the electrical connector 14 and the connector assembly 15 and/or communicative connection with other components. The status may be represented by a color of the light transmitted by the LED 70, the board light pipe 72 and/or the flexible light pipe 26. The status may be represented by a frequency of flashing of the light from the LED 70, board light pipe 72 and/or flexible light pipe 26. The status is communicated to the LED 70 based on electrical current received through the electrical connector 14 and/or connector assembly 15, such as along one or more of the signal contacts 46 and corresponding mating contacts of the board connector 62. Based on the data signals, the LED 70 generates light signals which are transmitted along the board light pipe 72 and flexible light pipe 26, such signals may be transmitted to the second electrical connector 16 and/or second connector assembly 17 (both shown in FIG. 1).

Figure 4:
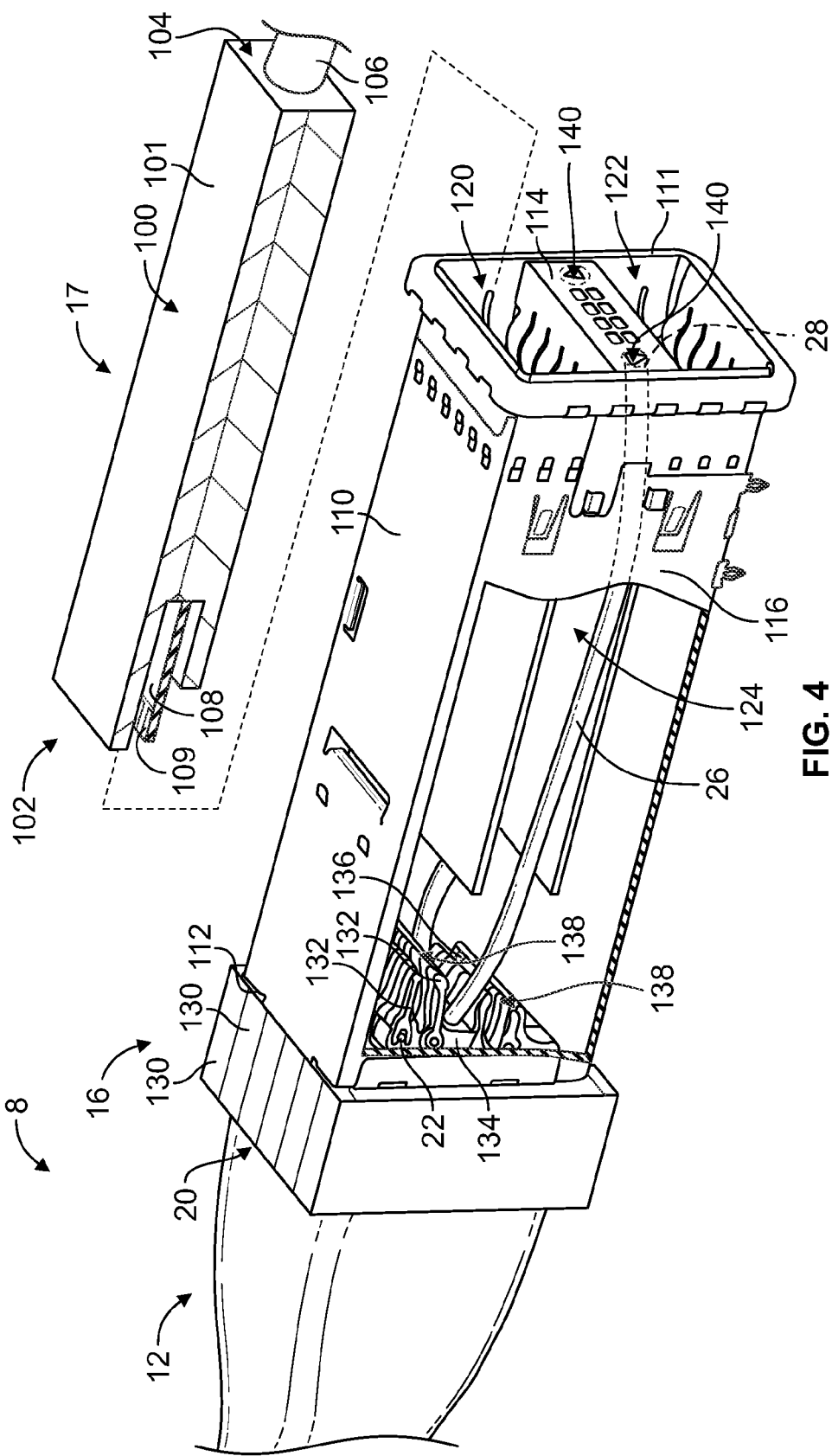
FIG. 4 is a perspective cross-sectional view of a portion of the cable connector system, showing an electrical connector and a connector assembly in accordance with an embodiment.

FIG. 4 is a perspective cross-sectional view of a portion of the cable connector system 8, showing the second electrical connector 16 and the connector assembly 17 in accordance with an embodiment. The connector assembly 17 may include one or more pluggable modules 100 that are configured to communicatively engage the electrical connector 16. The pluggable module(s) 100 define mating connector(s) of the connector assembly 17 that are configured to be mated with the electrical connector 16.

In some embodiments, the pluggable module 100 is an input/output (I/O) module configured to be inserted into and removed from the electrical connector 16. In some embodiments, the pluggable module 100 is a small form-factor pluggable (SFP) transceiver or quad small form-factor pluggable (QSFP) transceiver. The pluggable module 100 may satisfy certain technical specifications for SFP or QSFP transceivers, such as Small-Form Factor (SFF)-8431. In some embodiments, the pluggable module 100 is configured to transmit data signals up to 2.5 gigabits per second (Gbps), up to 5.0 Gbps, up to 12.0 Gbps, or more. By way of example, the electrical connector 16 and the pluggable module 100 may be similar to the receptacle cages and transceivers, respectively, which are part of the SFP+ product family available from TE Connectivity, Harrisburg, Pa. The pluggable module 100 may be other types of high speed I/O modules in other embodiments.

In some embodiments, the pluggable module 100 is an I/O cable assembly having a pluggable body 101 and a cable 106. The pluggable body 101 includes a mating end 102 and an opposite cable end 104. The cable 106 is coupled to the pluggable body 101 at the cable end 104. The pluggable body 101 also includes an internal circuit board 108 that is electrically coupled to wires (not shown) of the cable 106. The circuit board 108 includes contact pads 109 at the mating end 102. The mating end 102 is configured to be inserted into the electrical connector 16 in a loading direction.

The electrical connector 16 includes a receptacle housing 110, which may also be referred to as a cage 110. The cage 110 includes a front 111 and an opposite back 112. A faceplate 114 is provided at or is defined by the front 111. Relative or spatial terms such as "front," "back," "top," or "bottom" are only used to distinguish the referenced elements and do not necessarily require particular positions or orientations in the cable connector system 8 or in the surrounding environment of the cable connector system. For example, the front 111 may be located in or facing a back portion of a larger telecommunication system. In many applications, the front 111 is viewable to a user when the user is inserting the pluggable module 100 into the electrical connector 16.

The cage 110 is configured to contain electromagnetic interference (EMI) and guide the pluggable module(s) 100 during a mating operation. In some embodiments, the cage 110 is configured to permit air to flow through the cage 110 to transfer heat (or thermal energy) away from the electrical connector 16. To this end, the cage 110 includes a plurality of housing walls 116 that are interconnected with one another to form the cage 110. The housing walls 116 may be formed from a conductive material, such as sheet metal and/or a polymer having conductive particles. In the illustrated embodiment, the housing walls 116 are stamped and formed from sheet metal.

In the illustrated embodiment, the cage 110 includes a first (or upper) module cavity or port 120 and a second (or lower) module cavity or port 122. Each of the ports 120, 122 extends between the front and back 111, 112. The ports 120, 122 have respective port openings at the faceplate 114 that are sized and shaped to receive a corresponding pluggable module 100. The ports 120, 122 may have the same or similar dimensions and extend lengthwise in a direction that is parallel to the mating axis with the pluggable module 100. In the illustrated embodiment, the upper port 120 is stacked over the lower port 122 such that a channel 124 is defined therebetween. The channel 124 may be used for cooling of the pluggable modules 100. The channel 124 may be used for routing light pipes, such as the flexible light pipes 26 or dedicated, fixed light pipes, to the faceplate 114.

The electrical connector 14 includes a plurality of contact modules 130. The contact modules 130 include a plurality of signal contacts 132 held by a support body 134. Each signal contact 132 is terminated to a corresponding signal wire 22 of the cable bundle 12. Optionally, the contact modules 130 may include ground contacts 136, such as between signal contacts 132. The ground contacts 136 may be terminated to ground wires, ground shields or ground braids associated with the wires 22. The signal contacts 132 and corresponding ground contacts 136 may define one or more mating interfaces 138 of the electrical connector 16, which may be electrically connected to corresponding pluggable modules 100.

The support body 134 provides support for the contacts 132, 136 and/or the wires 22. For example, the wires 22 may extend into the support body 134 such that the support body 134 supports a portion of the wires 22. Optionally, the support body 134 may be overmolded over portions of the wires 22. The support body 134 may provide strain relief for the electrical wires 22. Optionally, the support body 134 may be fabricated from a plastic and/or other dielectric material.

As can be seen in FIG. 4, multiple contact modules 130 are loaded into the cage 110. In the illustrated embodiment, the cage 110 holds the contact modules 130 in parallel. Any number of contact modules 130 may be held by the cage 110 depending on the particular application.

Optionally, when the contact modules 130 are stacked in the cage 110, the contacts 132, 136 are aligned in a plurality of rows, such as four rows defining two mating interfaces 138. For example, two rows of contacts 132, 136 define a first or upper mating interface 138 used to electrically connect to contact pads 109 on both top and bottom sides of the circuit board 108 of the corresponding pluggable module 100, while another two rows of contacts 132, 136 define a second or lower mating interface 138 used to electrically connect to contact pads 109 on both top and bottom sides of the circuit board 108 of a different pluggable module 100. The first mating interface 138 is disposed within the upper port 120, and the second mating interface 138 is disposed within the lower port 122.

In alternative embodiments, the electrical connector 16 does not include the stacked ports 120, 122 and, instead, includes only a single port 120. In other alternative embodiment, the cage 110 may have multiple ports 120 and/or 122 arranged side-by-side. Optionally, multiple electrical connectors 16 may be ganged together.

In an exemplary embodiment, the channel 124 receives the flexible light pipe 26. For example, the flexible light pipe 26 exits the cable bundle 12 at the electrical connector 16 and extends forward of the second end 20 of the cable bundle 12 into the channel 124. The flexible light pipe 26 may extend through one or more of the contact modules 130, or alternatively, may extend around an outside of the contact modules 130. The flexible light pipe 26 extends along the channel 124 to the faceplate 114. In other embodiments, the flexible light pipe 26 may extend through other portions of the cage 110 or may extend around, over, or under the cage 110. In other embodiments, the second electrical connector 16 may have a rigid light pipe associated therewith, such as extending through the channel 124, and the flexible light pipe 26 may interface with the rigid light pipe.

The faceplate 114 includes one or more status indicator openings 140. The status indicator openings 140 are visible from the front by a user to determine a status of the cable connector system 8. For example, the second end 28, which may be a light emitting end of the flexible light pipe 26, is routed to the corresponding status indicator openings 140 and is visible through the status indicator opening 140. The flexible light pipe 26 defines a second light pipe interface 142 at the second end 28. The second light pipe interface 142 may be positioned at or beyond the second cable end 20, such as for interfacing with a component associated with the mating connector. The flexible light pipe 26 transmits light from the connector assembly 15 (shown in FIG. 1), and the light is emitted from the flexible light pipe 26 as a status indicator, which may relate to link status of the electrical connectors 14, 16 and/or connector assemblies 15, 17 and/or may relate to transmit and/or receive status of the electrical connectors 14, 16 and/or connector assemblies 15, 17. The status indicator may provide a visual indication as to the status of the electrical connectors 14, 16 and/or connector assemblies 15, 17 to an operator, such as at a server or network hub. The flexible light pipe 26 may extend a long distance or length from the first electrical connector 14 to the second electrical connector 16. Because the flexible light pipe 26 extends the length of the cable bundle 12, the light source 70 (shown in FIG. 2) and circuitry used to operate the light source 70 may be remote from the cage 110 and corresponding status indicator area. For example, the second electrical connector 16 does not need to be mounted to a circuit board, but rather may be mounted directly to a bezel or other panel. The circuit board 60 (shown in FIG. 2) may be located remote from the bezel or panel in an area where more space exists for housing the circuit board 60, the light source 70, the light source circuit and other components.

The status indicator openings 140 define components associated with the mating connector, which in the illustrated embodiment is the pluggable module 100. For example, one of the status indicator openings 140 is associated with the pluggable module 100 plugged into the upper port 120 and one of the status indicator openings 140 is associated with the pluggable module 100 plugged into the lower port 122. When the pluggable modules 100 are mated with the electrical connector 16, the flexible light pipe 26 may provide a link status indicating such. When the pluggable modules 100 are transmitting and/or receiving data, the flexible light pipe 26 may provide a transmit or receive status indicating such.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A cable assembly comprising:
   a cable bundle extending a length from a first cable end to an opposite second cable end, the cable bundle comprising a plurality of electrical wires within an outer jacket;
   a first electrical connector terminated to the first cable end of the electrical cable, the first electrical connector having first contacts defining a first mating interface for mating with a first mating connector;
   a second electrical connector terminated to the second cable end of the electrical cable, the second electrical connector having second contacts defining a second mating interface for mating with a second mating connector; and
   a flexible light pipe that extends along the length of the cable bundle, the flexible light pipe having a first light pipe interface at a first end of the flexible light pipe, the flexible light pipe having a second light pipe interface at a second end of the flexible light pipe, the first light pipe interface being at or beyond the first cable end for interfacing with a component associated with the first mating connector, the second light pipe interface being at or beyond the second cable end for interfacing with a component associated with the second mating connector.

2. The cable assembly of claim 1, wherein the flexible light pipe is part of the cable bundle for at least part of the length of the cable bundle.

3. The cable assembly of claim 1, wherein the flexible light pipe extends along at least a portion of the length interior of the outer jacket.

4. The cable assembly of claim 1, wherein the flexible light pipe extends along at least a portion of the length exterior of the outer jacket.

5. The cable assembly of claim 1, wherein the flexible light pipe exits the cable bundle at the first electrical connector for interfacing with the component associated with the first mating connector.

6. The cable assembly of claim 1, wherein the flexible light pipe exits the cable bundle at the second electrical connector for interfacing with the component associated with the second mating connector.

7. The cable assembly of claim 1, wherein the first end of the flexible light pipe abuts against the component associated with the first mating connector when the first electrical connector is mated to the first mating connector to receive light from the component.

8. The cable assembly of claim 1, wherein the flexible light pipe transmits light from the first end to the second end.

9. The cable assembly of claim 1, wherein the second mating connector includes a cage and a faceplate, the component includes a status indicator opening in the faceplate, the second end of the flexible light pipe is configured to extend through the cage to interface with the status indicator opening of the faceplate, the second light pipe interface emitting light indicative of a status of the second electrical connector.

10. The cable assembly of claim 1, wherein the first mating connector includes a board light pipe receiving light from a light emitting diode attached to a circuit board, the board light pipe defining the component associated with the first mating connector, the first end of the flexible light pipe being configured to abut against and receive light from the board light pipe.

11. A cable connector system comprising:
an electrical connector comprising a cage defining at least one port configured to receive a communication module therein, the cage having a faceplate at a front thereof having a status indicator opening in the faceplate, the electrical connector having a plurality of contacts defining a receptacle interface configured to communicatively couple with the communication module when plugged into the port; and
a cable assembly electrically coupled to the electrical connector and extending rearward of the cage, the cable assembly having a cable bundle comprising a plurality of electrical wires terminated to corresponding contacts of the electrical connector, the cable assembly having a flexible light pipe that extends along the cable bundle rearward of the cage, the flexible light pipe extending forward of the receptacle interface within the cage to the faceplate, the flexible light pipe having a light emitting end arranged at the status indicator opening in the faceplate to emit light indicative of a status of the electrical connector.

12. The cable connector system of claim 11, wherein the at least one port includes an upper port and a lower port with a channel therebetween, the flexible light pipe extending along the channel to the faceplate.

13. The cable connector system of claim 11, wherein the flexible light pipe extends through the receptacle interface.

14. The cable connector system of claim 11, wherein the cage extends between a front and a back, the faceplate being provided at the front, the receptacle interface being provided at the back, the cable assembly extending rearward from the back with the flexible light pipe extending from the cable assembly to the faceplate at the front.

15. The cable connector system of claim 11, wherein the flexible light pipe receives light from a light source remote from the electrical connector at an opposite end of the cable assembly.

16. A cable connector system comprising:
a circuit board having a light source mounted thereto;
a board connector mounted to the circuit board, the board connector having board contacts terminated to the circuit board;
a cable assembly coupled to the board connector, the cable assembly having an electrical connector electrically coupled to the board connector, the electrical connector having first contacts defining a mating interface for mating with the board contacts of the board connector, the cable assembly having a cable bundle extending from the electrical connector, the cable bundle comprising a plurality of electrical wires terminated to corresponding first contacts of the electrical connector, the cable assembly having a flexible light pipe that extends along the cable bundle, the flexible light pipe configured to receive the light emitted from the light source and transmit the light along the cable bundle to a remote location.

17. The cable connector system of claim 16, further comprising a board light pipe mounted to at least one of the circuit board or the board connector, the board light pipe having a first end receiving light from the light source, the board light pipe having a second end opposite the first end, the flexible light pipe arranged adjacent the second end of the board light pipe to receive light therefrom.

18. The cable connector system of claim 17, further comprising a cone at the second end receiving a light receiving end of the flexible light pipe.

19. The cable connector system of claim 16, wherein the flexible light pipe extend along an exterior of the electrical connector.

20. The cable connector system of claim 16, wherein the flexible light pipe extends through the electrical connector.

* * * * *